United States Patent [19]
Lindsay et al.

[11] Patent Number: 5,983,712
[45] Date of Patent: Nov. 16, 1999

[54] MICROSCOPE FOR COMPLIANCE MEASUREMENT

[75] Inventors: Stuart M. Lindsay, Phoenix; Tianwei Jing; Wenhai Han, both of Tempe, all of Ariz.

[73] Assignees: Molecular Imaging Corporation, Phoenix, Ariz.; Arizona Board of Regents, Tempe, Ariz.

[21] Appl. No.: 08/905,815

[22] Filed: Aug. 4, 1997

Related U.S. Application Data

[63] Continuation-in-part of application No. 08/710,191, Sep. 12, 1996, Pat. No. 5,866,805, which is a continuation-in-part of application No. 08/553,111, Nov. 7, 1995, Pat. No. 5,612,491, which is a division of application No. 08/403,238, Mar. 10, 1995, Pat. No. 5,513,518, which is a continuation-in-part of application No. 08/246,035, May 19, 1994, Pat. No. 5,515,719.

[51] Int. Cl.$^6$ .................................................. G01B 5/28
[52] U.S. Cl. ............................................................ 73/105
[58] Field of Search .............................. 73/105; 250/306, 250/307

[56] References Cited

U.S. PATENT DOCUMENTS

| | | |
|---|---|---|
| 5,224,376 | 7/1993 | Elings et al. . |
| 5,237,859 | 8/1993 | Elings et al. . |
| 5,266,896 | 11/1993 | Rugar et al. . |
| 5,329,808 | 7/1994 | Elings et al. . |
| 5,461,907 | 10/1995 | Tench et al. ............................... 73/105 |
| 5,468,959 | 11/1995 | Tohda et al. ........................... 73/105 X |
| 5,507,179 | 4/1996 | Gamble et al. . |
| 5,513,518 | 5/1996 | Lindsay ..................................... 73/105 |
| 5,515,719 | 5/1996 | Lindsay ..................................... 73/105 |
| 5,623,205 | 4/1997 | Tomita et al. . |

OTHER PUBLICATIONS

Florin, E. L., M. Radmacher, et al. (1993). "Atomic Force Microscope with magnetic force modulation." *Review of Scientific Instruments* 65 : 639–643.

Han, W., S. M. Lindsay, et al. (1996). "A magnetically–riven oscillating probe microscope for Operation in Liquids." *Applied Physics Letter* 69 : 4111–4114.

Rief, M., M. Gautel, et al. (1997). "Reversible Unfolding of Individual Titin Immunoglobin Domains by AFM." *Science* 276 : 1109–1112.

Lindsay, S.M., Y.L. Lyubchenko, et al. (1993). "Scanning Tunneling Microscopy and Atomic Force Studies Microscopy Studies of Biomaterials at a liquid–solid interface." *J. Vac. Sci. Technol.* 11 : 808–815.

O'Shea, S.J., M.E. Welland, et al. (1994). "Atomic force microscopy of local compliance at solid–liquid interfaces." *Chemical Physics Letters* 223 : 336–340.

*Primary Examiner*—Daniel S. Larkin
*Attorney, Agent, or Firm*—Killworth, Gottman, Hagan & Schaeff, LLP

[57] ABSTRACT

An atomic force microscope and method of operation are provided and include a force sensing probe tip adapted to be brought into close proximity with a sample surface, a scanning element for generating relative movement between the probe tip and the sample surface, a device for generating a magnetic field to cause deflection of the probe tip, a driver for the device, the driver including a source of alternating current and a source of a second current of a controlled magnitude, and a detector for detecting the position of the probe tip. In a preferred mode of operation, two signals, one of alternating current and the other of a fixed, but variable, current, are applied to cause a displacement of the time-average position of the probe tip.

19 Claims, 12 Drawing Sheets

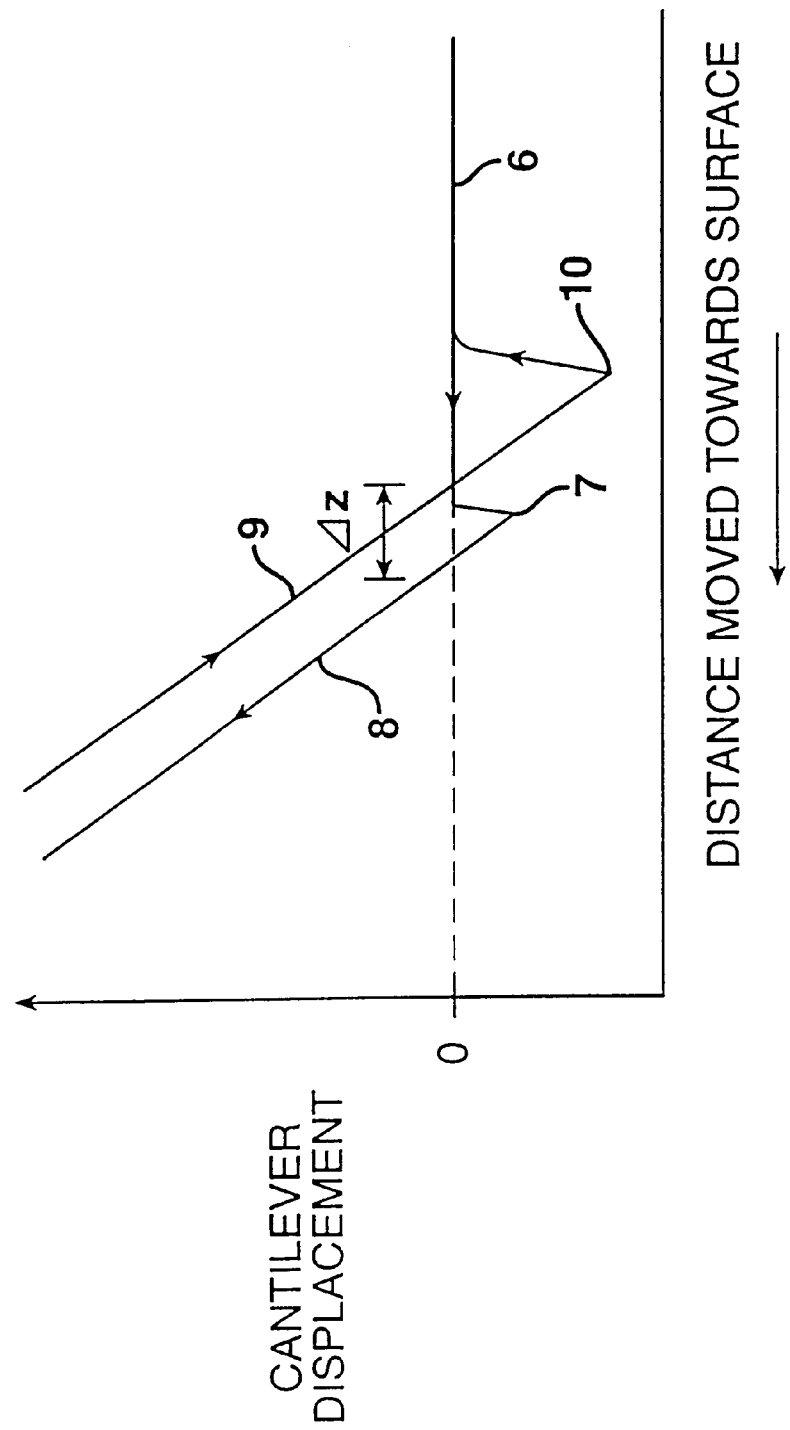

MICROSCOPE FOR COMPLIANCE MEASUREMENT

CROSS REFERENCE TO RELATED APPLICATIONS

This application is a continuation-in-part of U.S. application Ser. No. 08/710,191, filed Sep. 12, 1996, now U.S. Pat. No. 5,866,805, which is a continuation-in-part of U.S. application Ser. No. 08/553,111, filed Nov. 7, 1995, now U.S. Pat. No. 5,612,491, which is, in turn, a division of U.S. application Ser. No. 08/403,238, filed Mar. 10, 1995, now U.S. Pat. No. 5,513,518, which is, in turn, a continuation-in-part of U.S. application Ser. No. 08/246,035, filed May 19, 1994, now U.S. Pat. No. 5,515,719, the disclosures of all of which are hereby incorporated by reference. This application is also related to U.S. application Ser. No. 08/722,344, filed Sep. 27, 1996, now U.S. Pat. No. 5,753,814, and that disclosure is also incorporated by reference herein.

BACKGROUND OF THE INVENTION

This invention relates to an atomic force microscope for profiling the properties of a surface at nanometer resolution and for probing the properties of individual molecules attached to that surface.

The atomic force microscope utilizes a sharp probe which may be precisely positioned above a surface. The probe is attached to a positioning device via a soft (spring-like) cantilever. Interaction with the surface is indicated by motion of the probe end of the tip with respect to the driven end of the cantilever. In its common use for mapping the topography of a surface, this deflection is held constant by adjusting the probe to sample distance as the probe is scanned over the surface.

The interaction between the probe and the surface is of considerable interest in its own right. By sweeping the tip back and forth from the surface and monitoring the deflection of the probe relative to the driven end of the cantilever, so called force curves may be mapped out as taught by Elings et al., U.S. Pat. Nos. 5,224,376; 5,237,859; and 5,329,808. These curves are valuable both for setting the operating point of the microscope and for mapping the elastic properties of a surface.

The scheme for obtaining force curves according to the prior art is set out in FIG. 1A. A piezoelectric actuator 1 is used to sweep the stiff end of a cantilever 2 by some amount (labeled $X_D$) toward the sample S in FIG. 1A. The flexible cantilever 3 (having a stiffness $k_T$) bends as the tip 4 indents the sample, represented in FIG. 1A by a spring 5 of stiffness $k_s$. As a consequence, the displacement of the tip, $X_T$, is generally less than the displacement of the stiff end of the cantilever, $X_D$. This situation is represented in FIG. 1B which shows the arrangement of the two springs corresponding to the cantilever ($k_T$) and the sample ($k_s$) together with the displacement of the actuator ($X_D$) and the tip ($X_T$). In equilibrium, the force, F, along the mechanical path must be equal at all points and, far below resonant frequencies where the cantilever and sample behave as Hookean springs:

$$F = k_T(X_D - X_T) = k_s X_T \tag{1}$$

from which $$X_T = X_D \frac{k_T}{k_S + k_T}$$

so that $$F = \frac{k_S k_T}{k_S + k_T} X_D = k_{\text{eff}} X_D. \tag{2}$$

Here $k_{\text{eff}}$ is an effective spring constant describing the relationship between displacement and applied force at the point at which the force is applied. From Equation (2) we see that $$k_{\text{eff}} = \frac{k_S k_T}{k_S k_T}. \tag{3}$$

Thus, in this method for measuring the stiffness, the effective spring constant is equivalent to a series combination of the two springs represented by $k_S$ and $k_T$. In such a relationship, the weakest spring dominates the spring constant of the combination. Thus, this prior art scheme is of limited use for measuring the stiffness of soft samples, unless a correspondingly soft (i.e., having greater flexibility) cantilever is used. The use of soft cantilevers is often precluded by their increased propensity to jump into contact with the surface.

To make matters worse, the prior art method relies on sweeping either the entire sample up towards the tip, or the entire tip assembly (and scanning tube) down towards the sample. These massive components have a low resonant frequency by virtue of their mass, so this method is intrinsically slow, a disadvantage when it is desirable to obtain force curves rapidly.

A further disadvantage of this method of obtaining force curves lies with the piezoelectric material that is used as the displacement actuator. This material suffers from a considerable hysteresis. On reversing the direction of the applied voltage, the cantilever displacement usually lags the displacement at the same applied voltage but reached by scanning from the opposite direction. This is illustrated in FIG. 2 which shows a typical force curve. This is a plot of cantilever displacement versus distance moved towards or away from the surface. When the tip is far from the surface, the cantilever is not deflected so the plot is a flat horizontal line 6. When the tip is close enough to the surface, it often snaps uncontrollably into the surface (depicted at 7), remaining in contact and being pushed up by the surface (line 8). When the direction of the sweep is reversed, the tip comes down with the surface (line 9), but the scan is displaced by some amount $\Delta z$ along the horizontal axis owing to piezoelectric hysteresis. The cantilever tip pulls off the surface again (depicted at 10), further displaced from the original contact point by adhesion between the tip and surface. The amount of the hysteresis depends upon the sweep rate and other characteristics of the piezoelectric actuator and its history. It is a poorly characterized quantity and the source of considerable uncertainty in obtaining force curves.

Another method for driving the tip has been described by Lindsay et al., "Scanning Tunneling Microscopy and Atomic Force Microscopy Studies of Biomaterials at a Liquid-Solid Interface," *J. Vac. Sci. Technol.* 11:808–815 (1993); Lindsay, U.S. Pat. No. 5,513,518; and Lindsay, U.S. Pat. No. 5,515,719; and also by Florin et al., "Atomic Force Microscope with Magnetic Force Modulation," *Review of Scientific Instruments* 65:639–643 (1993) and O'Shea et al., "Atomic Force Microscopy of Local Compliance at Solid-Liquid Interfaces," *Chemical Physics Letters* 223:336–340 (1994). In this approach, a force is applied directly to the tip (as opposed to the rigid part of the cantilever holder) by fixing a magnetic particle or film on the tip and using an external magnetic field to drive the tip. This is illustrated schematically in FIG. 3A. Here, the actuator 1 is held in a fixed position, as is the rigid part of the cantilever assembly 2. The magnetic particle or film 12 is acted on by an external magnetic field so to exert a force F on the end of the flexible cantilever 3, pushing the tip 4 into the sample represented by the spring 11 of stiffness $k_S$. In this case, referring to FIG. 3B, both the stiff end of the cantilever and the sample are fixed so $$F = (k_S + k_T) X_T = k_{eff} X_T \quad (4)$$

where $$k_{eff} = k_T + k_S. \quad (5)$$

So, in this case, the cantilever and sample act as springs in parallel. This method has the advantage that a soft surface ($k_S$ small) does not lower the resonant frequency of the assembly appreciably. Furthermore, because only the tip is being moved, and this has by far the smallest mass of all the microscope components, rapid operation is possible.

There are two methods for driving the tip magnetically. In one (FIG. 4A) a particle of a magnetic material 12 is placed on the end of the cantilever 13 with its magnetic moment M aligned along the direction of desired motion. A magnetic field gradient, dB/dz, 14 is applied along the same direction as the magnetic moment, resulting in a force, $F_z$ along the z direction $$F_z = M_z \left( \frac{dB}{dz} \right). \quad (6)$$

A second geometry (FIG. 4B) utilizes a film having its magnetic moment M (15) perpendicular to the direction of desired motion. A magnetic field B is applied in the direction of desired motion 16 so that a torque, n is generated on the cantilever according to $$n = M \times \quad (7)$$

and, in the geometry shown, this is equivalent to a force on the end of the cantilever in the direction of desired motion $F_z$ given by $$F_z = \frac{|n|}{l} \quad (8)$$

where l is the length of the cantilever. This latter method of operation has been described by Lindsay, U.S. Pat. No. 5,515,718 and verified by Han et al., "A Magnetically-Driven Oscillating Probe Microscope for Operation in Liquids," *Applied Physics Letters* 69:4111–4114 (1996). It is more sensitive than the former method which relies on the magnitude of dB/dz. Large magnetic field gradients are difficult to generate. In the second method, where a given B field produces a torque, this is translated into a large force by the shortness of the cantilever, as described by Equation 8.

This method is most sensitive when operated in an AC mode as taught by Lindsay and Han et al, supra, and as demonstrated by the force curves obtained by O'Shea et al., supra. This method of operation is outlined in FIGS. 5A and 5B. When the cantilever 20 is far from the surface 21 (FIG. 5A), the tip is oscillated with an amplitude $X_0$. If the driving frequency is well below a resonance frequency of the tip, then $$X_0 = \frac{F_z}{k_T} \quad (9)$$

whereas, when the cantilever 20 is interacting with surface 21 (FIG. 5B) of stiffness $k_S$, $$X = \frac{F_z}{k_S + k_T}. \quad (10)$$

Thus, $$\frac{X}{X_0} = \frac{k_T}{k_S + k_T} \quad (11)$$

As the surface is approached, $k_S$ becomes much bigger than $k_T$ so that the ratio $X/X_0$ becomes $1/k_S$ or equal to the compliance of the sample or surface. It should be noted that a relationship similar to Equation 11 can be derived for the ratio $X_T/X_D$ for the case where the stiff end of the cantilever is driven. However, this is not experimentally useful because it is the quantity $X_T$ that is measured (referred to as X in equation 11). Where $X_T$ is far from the surface, it is not simply related to $X_D$ if the tip is driven in a medium such as a fluid, even if far from resonance.

For the case of direct-force driving of the tip near a surface, a plot of the quantity $X/X_0$ as a function of distance from the surface reflects the relative compliance of the surface, $(k_S/k_T)^{-1}$. Such a curve might more appropriately be called a compliance curve to differentiate it from a force curve. The inherently greater sensitivity and information content of compliance curves is illustrated by the measurements of O'Shea et al., supra.

Finally, there is presently considerable interest in measuring the stiffness of individual molecules attached between the tip and the surface as illustrated in FIG. 6. Chemical means are used to attach one end of a macromolecule 30 to the tip 4, while the other end is attached to the surface 21 below the tip 4. The prior art has consisted of generating a force curve (like that shown in FIG. 2) as the molecule is stretched or compressed by motion of the piezoelectric actuator 1. An example of such a measurement is the recent work by Reif et al., "Reversible Unfolding of Individual Titin Immunoglobulin Domains by AFM," *Science* 276:1109–1112 (1997). Dramatic variations in stiffness were observed as particular domains of a protein were unfolded sequentially.

Accordingly, the need still exists in this art to provide an apparatus for measuring the compliance of samples on a nanometer scale as a function of the approach distance of a tip more rapidly and without the hysteresis problems of the prior art. There is also a need to provide a method for setting the operating point of an imaging microscope to a fixed value of surface compliance prior to scanning the tip over the surface.

SUMMARY OF THE INVENTION

The foregoing needs are met by an atomic force microscope in accordance with the present invention having a force sensing probe tip to which a magnetic film or particle is attached and a magnetic field generating device such as a solenoid to generate a magnetic field to apply a force on the tip. The tip is attached to a cantilever which is in turn attached to a piezoelectric actuator capable of generating motion in the x, y, and z directions. Motion of the tip is detected by a position sensitive detector. In a preferred embodiment of the present invention, two signals are applied to the solenoid. One is an alternating current (AC) signal which is used to determine the compliance of the sample under the tip. The other signal may be a static (fixed) current, applied to cause a displacement of the time-average position of the tip. By slowly varying the second signal while monitoring the amplitude of the rapidly varying signal owing to the first signal, the compliance of the sample as a function of the distance between the tip and the surface may be obtained rapidly, without motion of the piezoelectric actuator, and thus, without hysteresis.

In this preferred embodiment, the signal from the position sensitive detector is fed to a phase sensitive detector which determines the absolute value of the rapidly varying component owing to modulation by the first AC signal, rejecting the more slowly varying signal that is applied so as to move the tip closer to or further from the surface. The output of the phase sensitive detector is fed to an analog to digital converter and thus to a computer. In this embodiment, the same computer is also used to generate the slowly varying signal which controls the average position of the tip. Thus, the signal from the phase sensitive detector (which is proportional to the sample compliance) may be mapped on a display as a function of distance from the surface.

In another embodiment of the invention, these data are gathered in a series of steps in which the piezoelectric actuator is stepped by some relatively large amount and then halted. Compliance data are then obtained by displacing the tip magnetically. The piezoelectric actuator is then moved to the end of the range of the previous sweep with the tip retracted magnetically, and the sweep repeated. In this way, a number of magnetically-swept compliance curves may be accumulated over a large distance and spliced together by the computer.

In yet another embodiment, the tip is moved to a position of interest with respect to the surface of the sample using either the piezoelectric actuator or a signal applied to the solenoid. The tip is then moved rapidly to a new position by the application of a step increase or decrease in the current applied to the solenoid. The compliance is recorded as a function of the elapsed time from this transient step by recording the amplitude of the AC signal using the phase sensitive detector, acquiring a digital signal from an analog to digital converter, and displaying on the computer the relative compliance as a function of time from the jump in strain applied to the sample. In this way, the dynamic elastic properties of the sample may be mapped. By mapping the out-of-phase component of the rapidly oscillating signal, the viscosity of the sample may be obtained.

The plot of compliance versus distance is an extremely sensitive method for placing the probe at a precise distance above the surface, and curves of relative compliance versus position of the tip from the surface are used to choose an operating point for the microscope when it is used in an imaging mode.

Accordingly, it is a feature of the present invention to provide an apparatus for measuring the compliance of samples on a nanometer scale as a function of the approach distance of a tip more rapidly and without the hysteresis of the prior art. It is a further feature of the invention to provide a method for setting the operating point of an imaging microscope to a fixed value of surface compliance prior to scanning the tip over the surface. These and other features and advantages of the present invention will become apparent from the following detailed description, the accompanying drawings, and the appended claims.

BRIEF DESCRIPTION OF THE DRAWINGS

FIG. 2 is a force curve gathered according to the prior art;

DETAILED DESCRIPTION OF THE PREFERRED EMBODIMENTS

Figure 7:
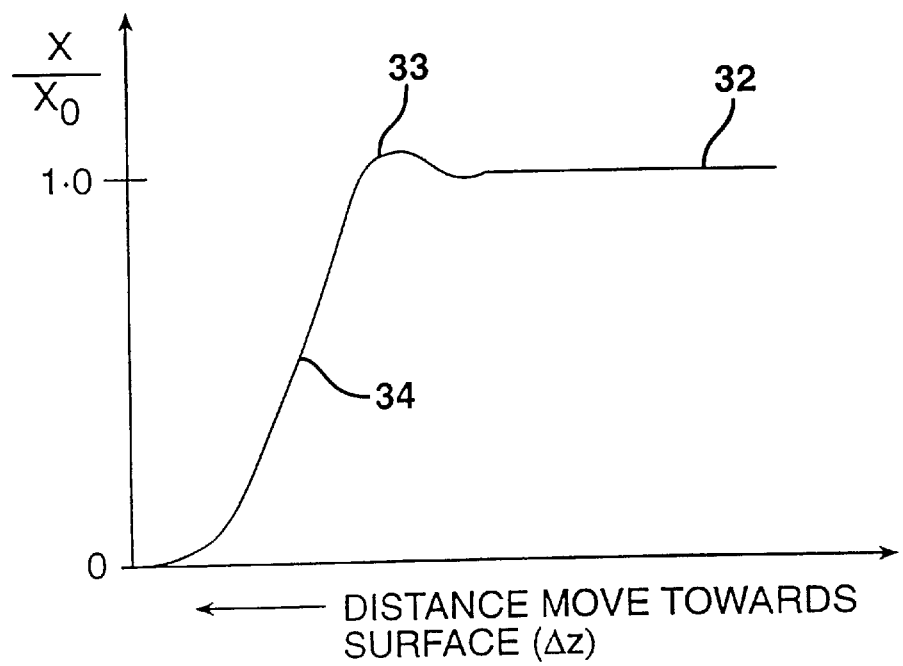
FIG. 7 is a plot of the normalized amplitude of oscillation as the tip is moved closer towards the surface.

The electronic circuits for obtaining the relative amplitude and phase of the magnetically-oscillated tip are described by Han et al, in U.S. application Ser. No. 08/722,344, filed Sep. 27, 1996, now U.S. Pat. No 5,753,814, the disclosure of which is hereby incorporated by reference. The amplitude signal is proportional to the $X/X_0$ of Equation 11, and therefore, when the tip is close to the sample surface, is proportional to surface compliance. A representation of a plot of this quantity as a function of distance from the surface for a typical measurement is shown in FIG. 7. Far from the sample surface, the value of $X/X_0$ is 1.0 as shown at the generally horizontal portion of the curve 32. As the sample surface is approached, the value changes. An attractive interaction can give rise to a region where the surface compliance is negative, so $X/X_0$ can exceed unity as shown at 33. However, as the surface is approached more closely, $X/X_0$ inevitably falls as shown at 34, falling to zero when the tip is in hard contact with the sample surface.

Figure 8:
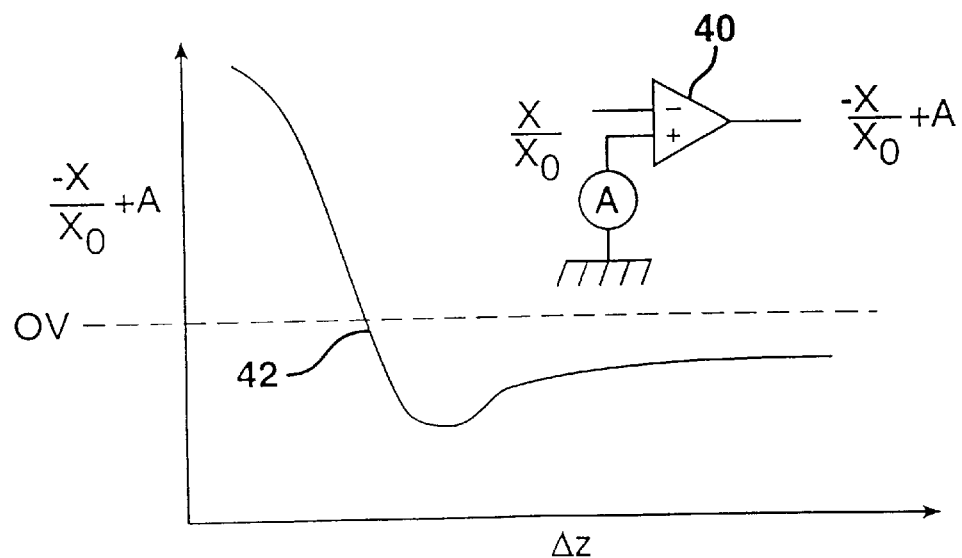
FIG. 8 is a plot showing the data of FIG. 7 re-plotted according to Equation 12, with the offset and inversion shown in the inset.

This curve can be inverted electronically as shown schematically by the inset in FIG. 8 at 40. With an offset signal A added to $X/X_0$, the output becomes $$F(\Delta z) = \frac{-X(\Delta z)}{X_0} + A. \quad (12)$$

When this signal is plotted as a function of distance moved towards the sample ($\Delta z$), it bears a resemblance to the force curve shown in FIG. 2. However, it should be recalled that the force curve is only indirectly related to the sample surface elastic properties when data is taken in a liquid. The curve plotted in FIG. 8 is related to these properties simply by Equations 12 and 11. The null or zero value of the signal represented by $F(\Delta z)$ (Equation 12) may be adjusted to any point along the curve by altering the value of the offset voltage A. By using a microscope with a feedback controller which adjusts the height of the sample so as to maintain this null signal, the microscope can be operated at any single valued point on the compliance curve, such as, for example, the point labeled 42 in FIG. 8. Increasing the value of A moves the whole curve upward, resulting in a set point corresponding to contours of a bigger surface compliance. A smaller value of A moves the whole curve down, resulting in a set point corresponding to contours of a smaller surface compliance. It is desirable to obtain images at as large a value of compliance as possible because this corresponds to a smaller decrease of amplitude of the tip oscillation as the surface is contacted, and therefore a smaller deposition of energy into the sample. However, the best resolution may often be obtained by decreasing the set-point compliance (increasing A) somewhat beyond the smallest value that gives stable operation of the microscope.

In the example just given, the compliance signal is acquired by setting the tip oscillation amplitude to a desired value (typically 5 nanometer (nm) peak to peak operating in fluids) and recording the amplitude using the phase sensitive detection technique of Han et al, U.S. application Ser. No. 08/722,344, now U.S. Pat. No. 5,753,814, as the tip is moved toward the sample with a piezoelectric actuator as is well known and described in the background section of this application. Although the $X/X_0$ signal is easier to interpret than a conventional force curve, it still suffers from the hysteresis and slow-scanning limitations of the piezoelectric actuator. These limitations are removed if the piezoelectric actuator is held fixed, and a second signal is applied to the driving solenoid to move the tip directly.

Figure 9:
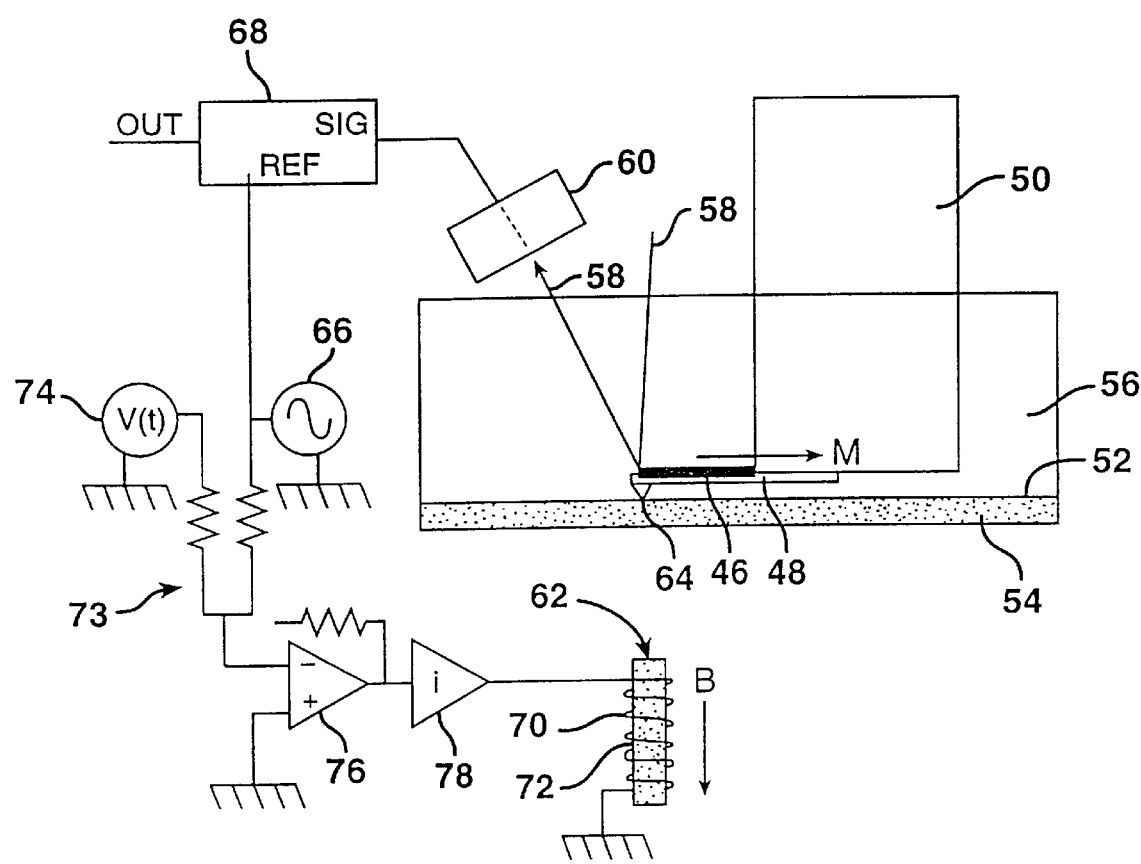
FIG. 9 is a schematic illustration of the overall layout of the magnetically modulated force sensing microscope of the present invention, including an electronic circuit for driving the force sensing probe tip with a programmed magnetic waveform.

This mode of operation is illustrated in FIGS. 9 and 10. Referring to FIG. 9, an overall layout of the scanning force microscope of the present invention is illustrated. As shown, a thin film or particles of a magnetic material 46 is applied to the back of a force sensing cantilever probe 48. The cantilever probe 48 is attached to a scanning element such as a piezoelectric scanning transducer 50 which holds the probe above the surface 52 of sample 54 which may, optionally, be submerged in a body of fluid 56.

A laser beam 58 is reflected from the back of cantilever probe 48 into a position sensitive detector 60 so that deflections of the probe may be detected and recorded. A small solenoid 62 is placed near cantilever probe 48 so as to generate a magnetic field B which is predominantly perpendicular to the soft axis of the cantilever. Alternatively, the solenoid may be positioned on the back surface of cantilever probe 48 and the magnetic film or particles 46 may be positioned near to the probe to achieve the same result. Solenoid 62 includes pile-wound wire 70 on a ferrite core 72 (such as a manganese zinc ferric oxide available from Fair-Rite Products Corp. of Wallkill, N.Y. under the designation "Fair-Rite 77").

For the purpose of modulating the position of probe tip 64 with respect to sample surface 52, a driver 73 which includes an alternating current (AC) voltage source 66 is used to drive solenoid 62. The corresponding modulation level is detected by synchronous position detector 68 which is also driven with the AC signal from source 66 as a reference. In the preferred embodiment shown in FIG. 9, a second signal is supplied from the driver in the form of a waveform from a programmable signal generator 74 (such as a digital computer with a digital to analog output board) which is added to the AC signal 66 used to oscillate the tip 64 with an operational amplifier summer 76. The summed voltage is sent to a voltage to current converter 78 and thence to the solenoid 62.

The programmable voltage V(t) is chosen to change the force on the tip according to Equations 7 and 8 by causing a programmed change in the magnetic field (B) applied by the solenoid. The AC voltage is set to the smallest value that will yield an adequate signal to noise ratio. This is somewhat dependent on the rate at which the tip is swept and the stiffness of the cantilever. A typical value with a 1 N/m cantilever swept over 100 nm in 10 mS is 1 nm peak to peak. With a cantilever magnetized to a moment in the plane of the cantilever of $5 \times 10^{-10}$ Am$^2$, the ramp voltage from signal generator 74 is chosen to drive a current from zero to 300 mA in a 1 mH solenoid placed about 1 mm from the tip. This results in a displacement of 100 nm over the duration of the ramp. The AC component 66 is chosen to drive an RMS current of 2 mA, resulting in a peak to peak oscillation of about 1 nanometer.

Figure 10A:
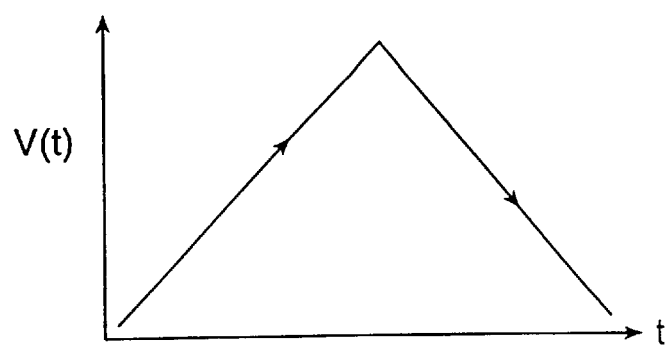
FIGS. 10A through 10D are plots showing typical waveforms used to obtain compliance curves, with 10A showing a voltage ramp which ultimately drives the tip away from and then back towards the surface, 10B showing the combined current signal consisting of the slow ramp and the fast oscillating component used for driving the tip, 10C showing the corresponding plot of $X(t)/X_0$, and 10D showing $X(t)/X_0$ mapped as a function of distance by changing the scan direction on reversal of the ramp direction.
Figure 10B:
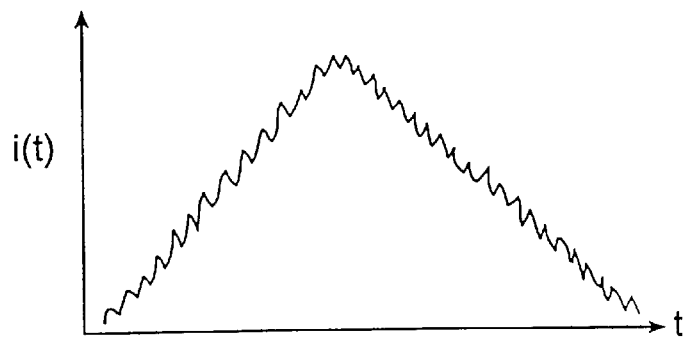
Figure 10C:
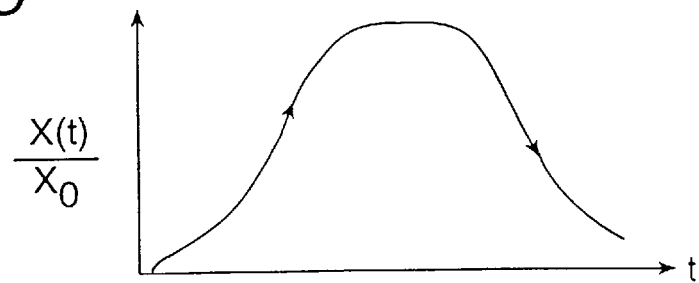
Figure 10D:
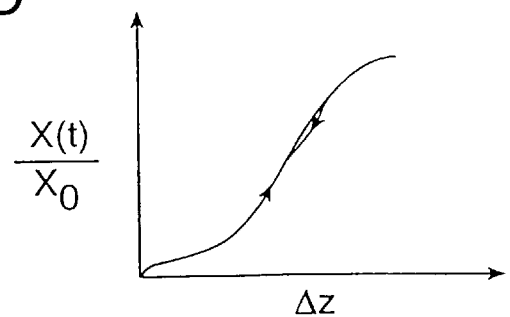

FIG. 10A shows the waveform used to displace the cantilever while FIG. 10B shows the current wave form driving the solenoid. The resultant $X(t)/X_0$ curves are shown in FIG. 10C. These curves differ little from those obtained by sweeping the piezoelectric actuator. However, they can be obtained more rapidly and do not suffer from the degree of hysteresis of curves obtained by sweeping the piezoelectric actuator. This is illustrated in FIG. 10D where $X(t)/X_0$ is plotted as a function of $\Delta z$ by reversing the sweep direction on the return ramp. The up- and down-scans are essentially indistinguishable, in contrast to data taken with a piezoelectric actuator.

Figure 1A:
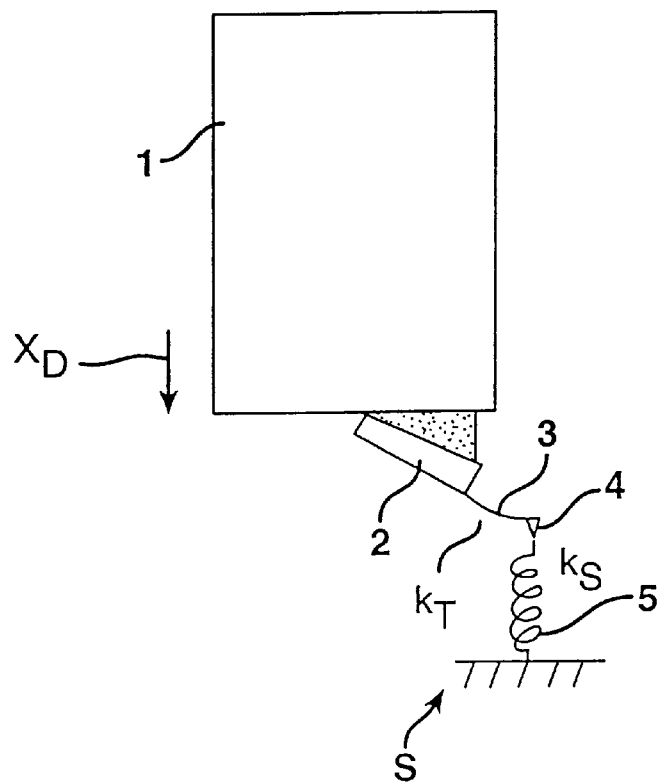
FIG. 1A is a schematic arrangement of a prior art atomic force microscope, including a piezoelectric actuator, cantilever, and sample (represented by a spring) for collecting force curves according to the prior art.
Figure 1B:
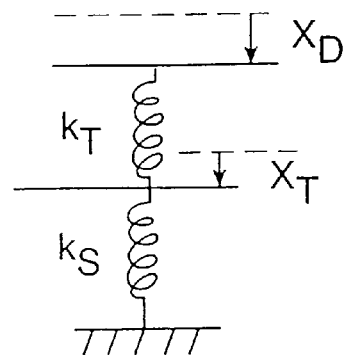
FIG. 1B is a schematic representation of the cantilever spring and sample of FIG. 1A as driven by motion of the piezoelectric actuator.
Figure 3A:
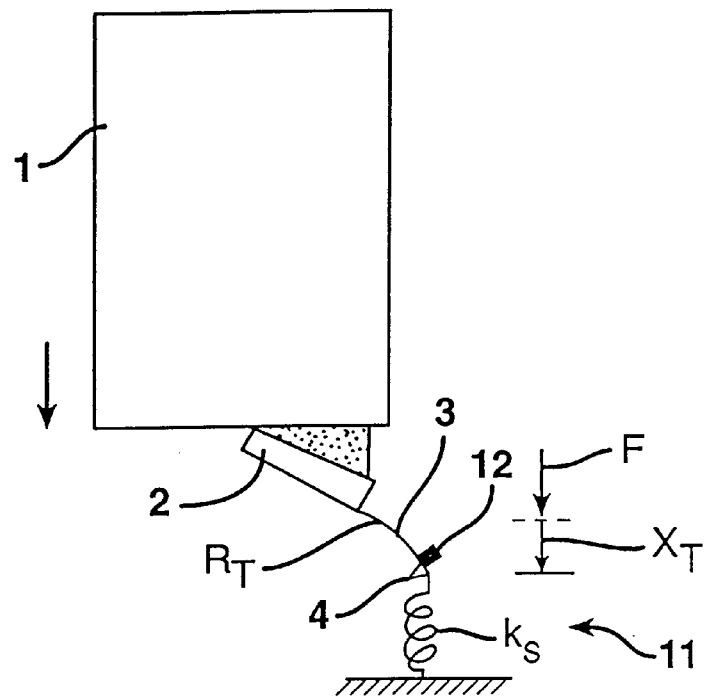
FIG. 3A is a schematic representation of a prior art arrangement for applying a force to a cantilever magnetically.
Figure 3B:
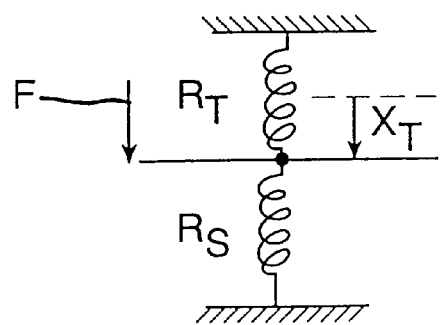
FIG. 3B is a schematic representation of the equivalent mechanical arrangement of the cantilever and sample springs of FIG. 3A driven by a magnetic force.
Figure 4A:
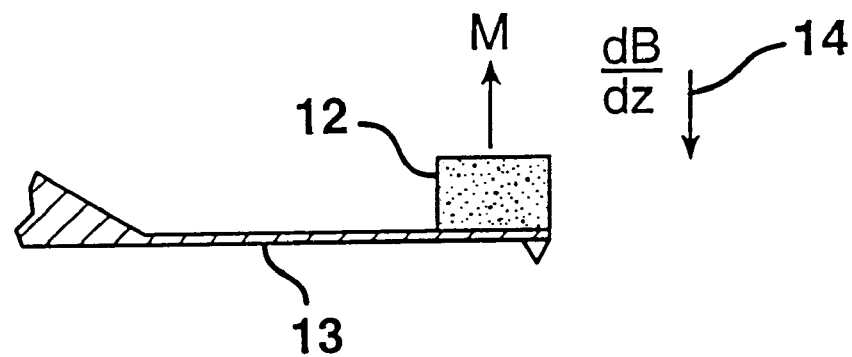
FIGS. 4A and 4B illustrates two alternative prior art methods whereby a force may be applied to a cantilever magnetically.
Figure 4B:
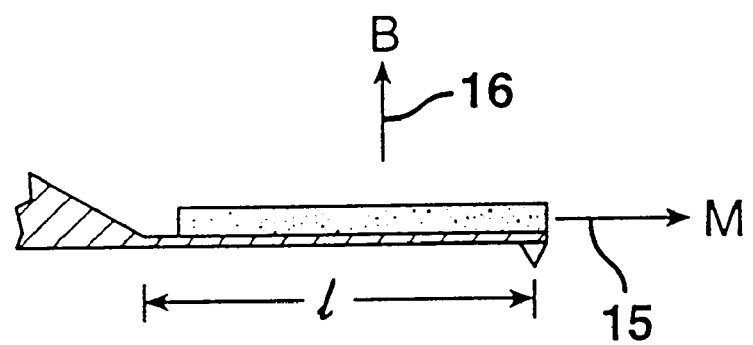
Figure 5A:
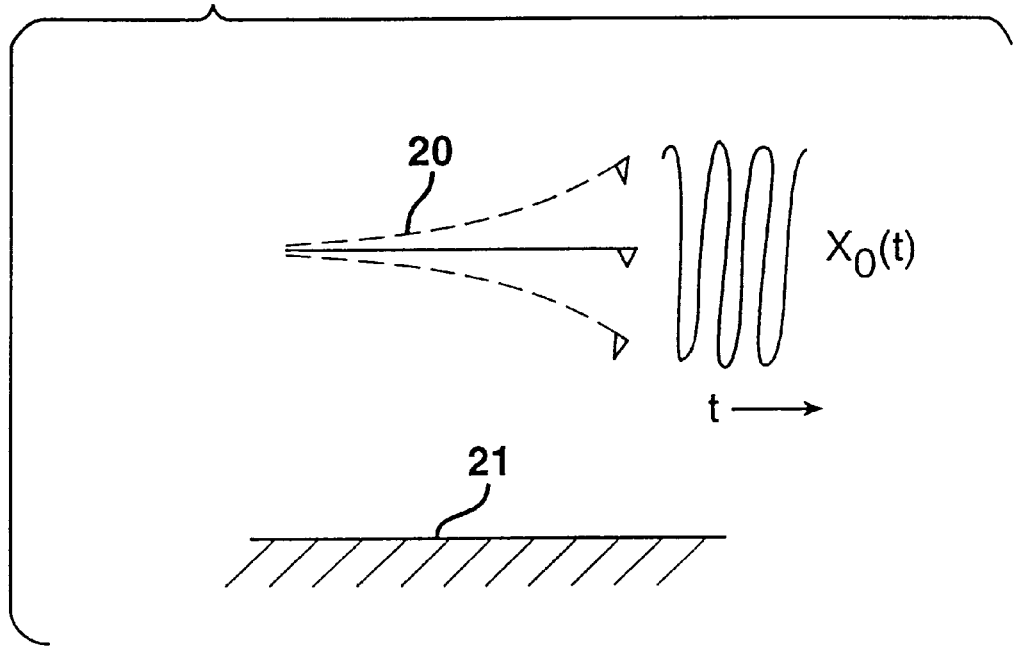
FIGS. 5A and 5B schematically show a tip magnetically oscillated in accordance with the prior art far from the surface and closer to the surface, respectively, where the surface elastic response begins to contribute to the tip motion.
Figure 5B:
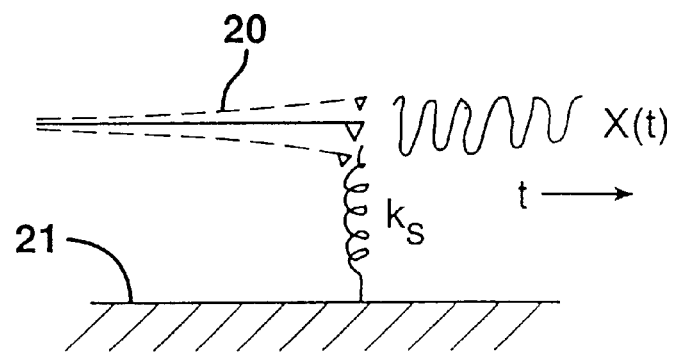
Figure 6:
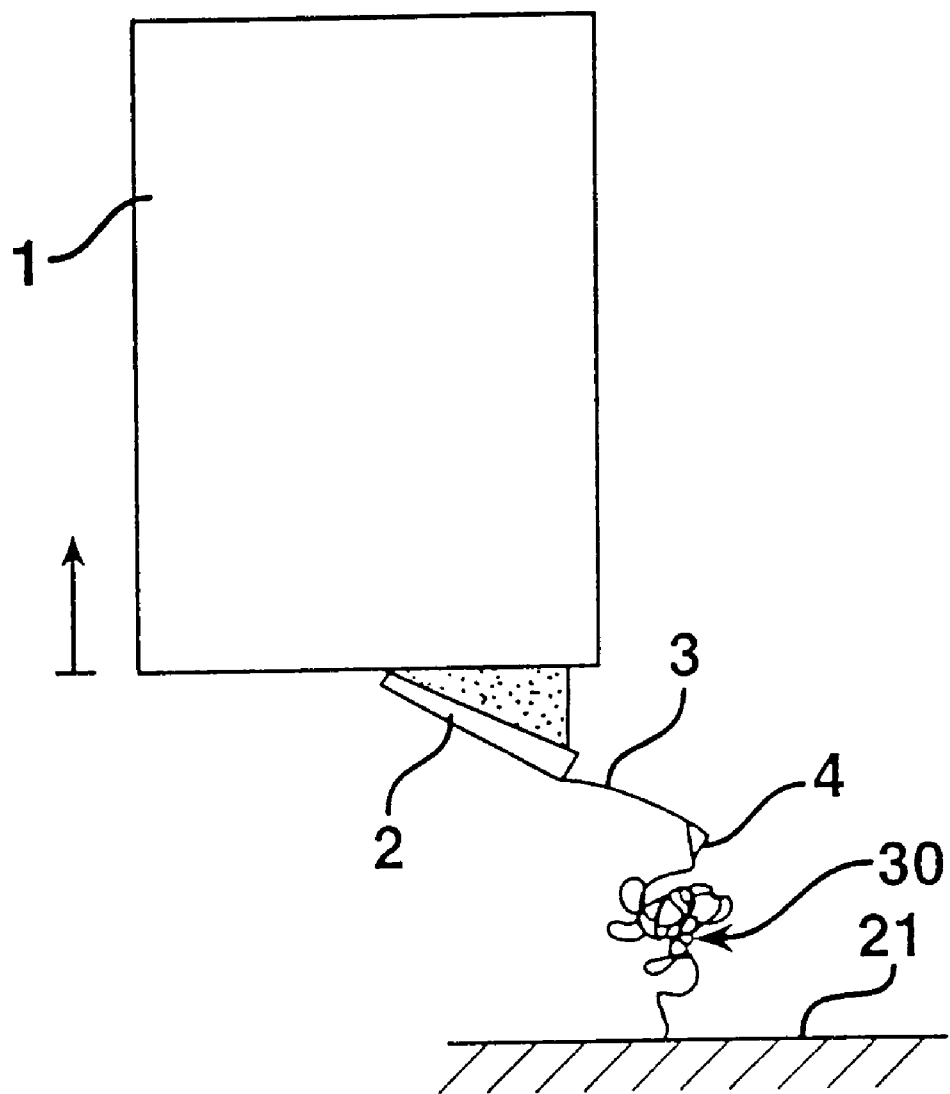
FIG. 6 is a schematic representation of an arrangement for obtaining a force-curve from a single molecule trapped between the tip and a substrate.
Figure 11:
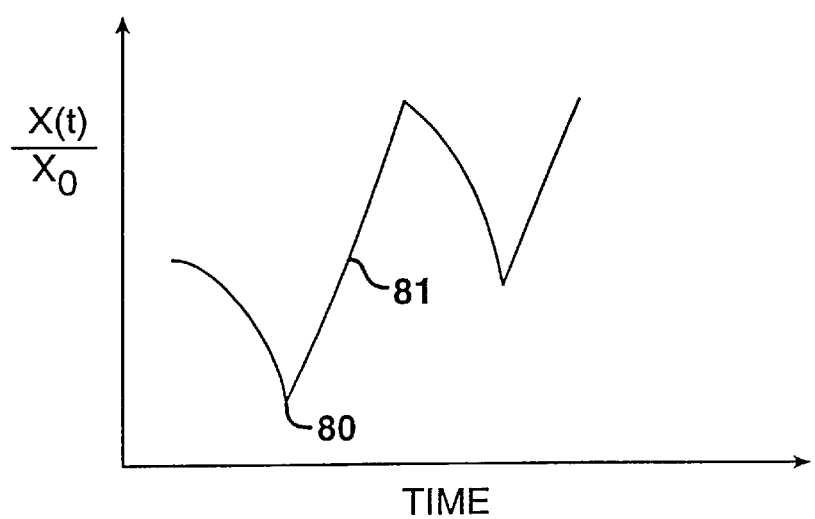
FIG. 11 is a plot of a compliance curve from a complex system such as an unfolding molecule showing a decrease in compliance initially as the molecule is stretched, followed by a rapid increase as the molecule unfolds.

A rapid scan is particularly advantageous when obtaining data from single molecules which come apart through the untangling of distinct domains such as the experiment illustrated in FIG. 6 and reported by Reif et al., supra. In this case, the force curves are highly structured so that the corresponding compliance curve is also highly structured. However, the compliance data may be obtained over a much wider range of scan rates, with greater force sensitivity and simpler interpretation. Referring to FIG. 11, an initial decrease in compliance is seen as the molecule is stretched and becomes stiffer (here the driving magnetic field is applied so as to pull the tip away from the surface with time). At a critical strain corresponding to the point 80 part of the molecule unfolds, increasing its compliance rapidly as shown by the portion of the curve 81. The compliance rises to a new high value and then falls again as the molecule is stretched.

One advantage of the present invention is that a molecule can be moved to a critical point such as that marked 80 in FIG. 11 and the strain held constant while the unfolding is monitored as a function of time. This requires a rapid change from a linearly changing strain to a static strain. This is difficult to achieve using a piezoelectric actuator because of its much slower response.

Figure 12A:
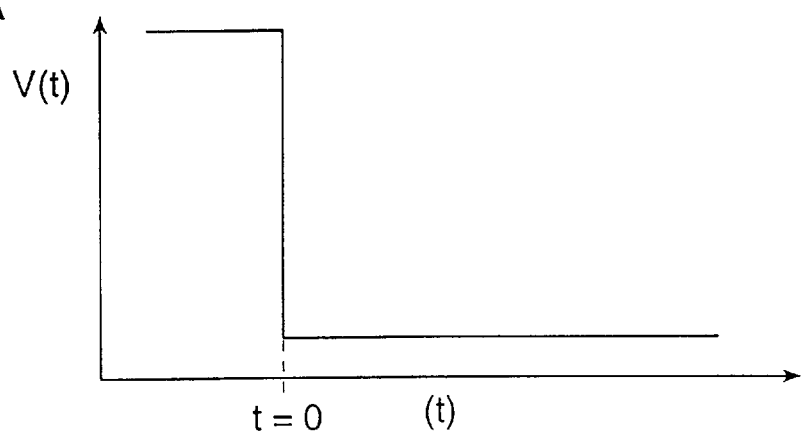
FIGS. 12A and 12B are dynamic stress relaxation data obtained by stepping the force on the tip using a jump in the applied magnetic field; and monitoring the consequent changes in $X(t)/X_0$, respectively.
Figure 12B:
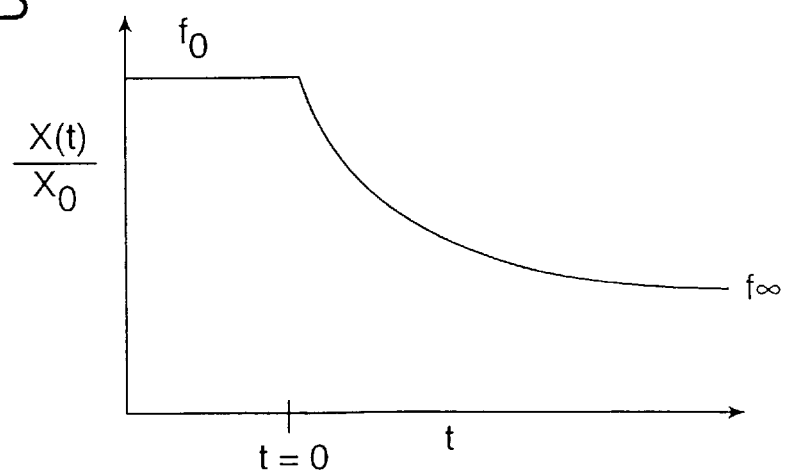

In polymer systems, the rate at which a molecule relaxes to accommodate an applied strain is a quantity of fundamental importance, and macroscopic stress-strain curves are a well known tool of polymer research. With the present invention, it becomes possible to carry out dynamic relaxation measurements on single molecules or regions under the tip of nanometer dimensions. This is done by jumping the position of the tip discontinuously using the programmed voltage (74 in FIG. 9.) while applying a small modulation to measure $X(t)/X_0$. An example of such a stepped waveform is shown in FIG. 12A. In this example, the current through the solenoid is changed at t=0 so as to push the tip abruptly into the sample surface. The value of $X(t)/X_0$ is shown in FIG. 12B. It remains constant until t=0 at a value $f_0$, and begins to decay at t=0 until a new equilibrium value $f_\infty$ is reached. Characteristically, $X(t)/X_0$ decays as $$\frac{X(t)}{X_0} = f_0 - (f_0 - f_\infty)[1 - \exp(-t/\tau)] \quad (13)$$

where $\tau$ is the characteristic relaxation time of the sample. Using this method, it is possible to take relaxation data on time scales comparable to the resonant frequency of the cantilever in the fluid environment. A cantilever with a resonant frequency of 100 kHz can be driven in stepwise motion over several nanometers in 20 microseconds using current steps of tens of milliamps applied to a solenoid of 1 mH inductance. Relaxation times of 200 microseconds or more are easily determined from the decay of $X(t)/X_0$.

Figure 13:
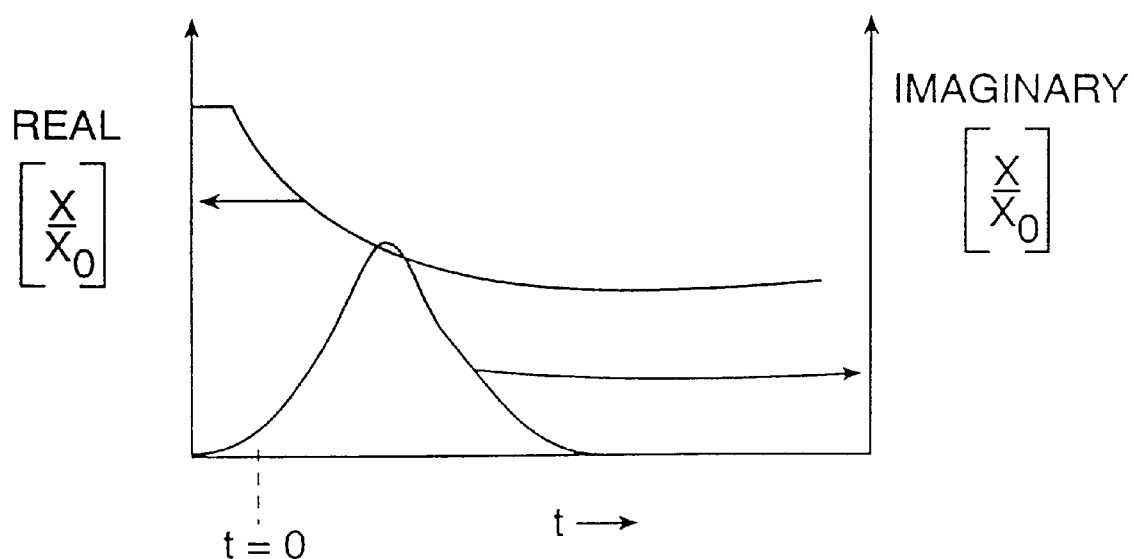
FIG. 13 is a simultaneous plot showing the real component of $X(t)/X_0$ (left axis, corresponding to the amplitude signal) and the imaginary component of $X(t)/X_0$ (right axis, corresponding to the phase signal)

Similar dynamic relaxation data may be obtained by using the phase (as opposed to amplitude) data. The control circuitry described in Han et al, U.S. application Ser. No. 08/722,344, now U.S. Pat. No. 5,753,814, gives outputs both proportional to the amplitude (in-phase or real part of the signal) and a phase signal proportional to the amount of signal phase-shifted 90 degrees from the driving signal (out-of-phase or imaginary part of the signal). The phase signal is related to the mechanical loss of the tip-substrate mechanical system and determines, in effect, a viscosity for the system. A simultaneous plot of the compliance signal and the out-of-phase signal in a dynamic stress-jump experiment such as that described above is shown in FIG. 13. A model for the relaxation process fitted to both these data sets may permit extraction of both elastic properties and viscous properties of the sample.

One limitation of the present invention in its preferred embodiment lies with the restricted range of vertical motion obtained by magnetic deflection alone. In the example just given, a current of up to 300 mA deflected the cantilever by 100 nm. It is often desirable to move the cantilever over a larger vertical distance, sometimes as much as one micron. It becomes impractical to use larger magnetic fields both because of heating and because of size limitations on the driving solenoid. In this case, the desired translation can be obtained by a tandem combination of a piezoelectric actuator and magnetic cantilever deflection. This is illustrated in FIG. 14.

Figure 14A:
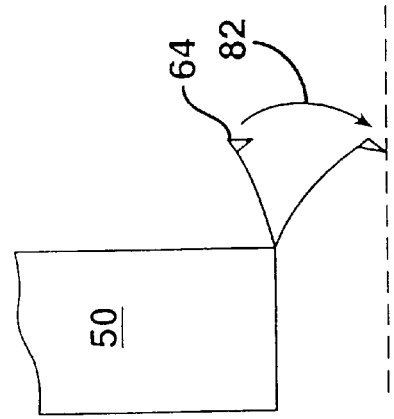
FIG. 14 is a schematic representation of extended motion whereby magnetic deflection and motion of the piezoelectric actuator are combined.
Figure 14B:
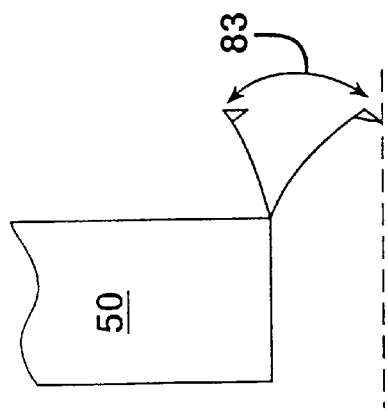
Figure 14C:
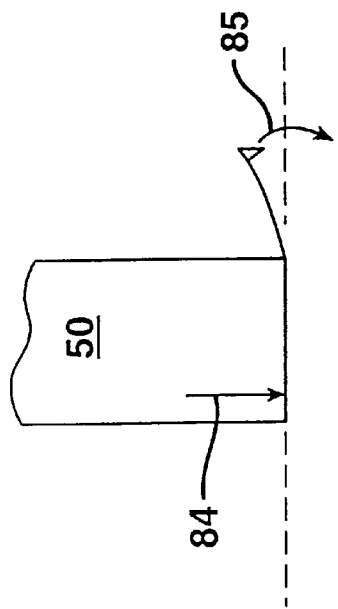

Referring to FIG. 14A, the piezoelectric actuator 50 is held at a fixed height while the cantilever tip 64 is swept down in a direction 82 by the application of a magnetic field. The magnetic filed is then reversed rapidly (FIG. 14B) so that the tip is swept up in a direction 83, and the piezoelectric actuator is moved down in a direction 84 (FIG. 14C) so that the tip is at the height of its lowest location on the prior magnetic sweep. The magnetic sweep is then repeated to scan the tip down in a direction 85 through a new height range. If further motion is required, the cycle is repeated as needed. Data for $X(t)/X_0$ is stored in a computer for each of the down-sweeps driven by the magnet and displayed on a screen juxtaposed so as to give a continuous display of this quantity over the entire range of vertical (z) motion covered by the tandem action of the piezoelectric transducer and the magnetically-driven tip.

While certain representative embodiments and details have been shown for purposes of illustrating the invention, it will be apparent to those skilled in the art that various changes may be made without departing from the scope of the invention, which is defined in the appended claims.

What is claimed is:

1. An atomic force microscope comprising: a force sensing probe tip adapted to be brought into close proximity with a sample surface; a scanning element for generating relative movement between said probe tip and said sample surface; a device for generating a magnetic field to cause deflection of said probe tip; a driver for said device, said driver including a source of alternating current and a second source of a second current of a controlled magnitude; and a detector for detecting the position of said probe tip.

2. An atomic force microscope as claimed in claim 1 wherein said source of said second current produces a varying current.

3. An atomic force microscope as claimed in claim 1 further including a phase sensitive detector adapted to receive a signal from said position detector.

4. A method of operating a scanning probe microscope, said microscope including a force sensing cantilever having a probe tip, said method comprising the steps of applying a magnetic driving force to said force sensing cantilever, measuring the movement of said probe tip in response to said driving force as said probe tip is moved in relation to a sample surface, and recording said movement of said probe tip as data of relative displacement of said probe tip versus the distance of said probe tip from said sample surface.

5. A method as claimed in claim 4 including the step of using said recorded data to set the operating point of said microscope by choosing a point on a plot of relative displacement versus distance from said sample surface.

6. A method of operating a scanning probe microscope, said microscope including a force sensing cantilever having a probe tip, said method comprising the steps of applying a magnetic driving force to said force sensing cantilever probe tip, said driving force comprising a first signal to cause an oscillatory motion of said probe tip and a second signal to cause a displacement of the time average position of said probe tip.

7. A method as claimed in claim 6 in which said first signal is an alternating current.

8. A method as claimed in claim 6 in which said second signal is a fixed current.

9. A method as claimed in claim 8 in which said second signal is varied over time.

10. A method as claimed in claim 6 in which movement of said probe tip is recorded as a function of the distance between said probe tip and the surface of a sample.

11. A method as claimed in claim 10 in which said movement is sensed by a position sensitive detector.

12. A method as claimed in claim 11, including the steps of supplying a third signal from said position sensitive detector which is a function of said probe tip movement to a phase sensitive detector.

13. A method of measuring the dynamic elastic properties of a sample using a scanning probe microscope, said microscope including a force sensing cantilever having a probe tip, said method comprising the steps of applying a driving force to said probe tip, changing said driving force, and recording the movement of said probe tip as a function of time.

14. A method as claimed in claim 13 in which said driving force is a magnetic driving force supplied by a solenoid, and said magnetic driving force is changed by changing the current applied to said solenoid.

15. A method as claimed in claim 13 in which said driving force is supplied by a piezoelectric actuator, and said driving force is changed by applying a magnetic driving force to said probe tip.

16. A method as claimed in claim 13 including the step of recording the out-of-phase motion of said probe tip as a function of time.

17. A method of operating a scanning probe microscope, said microscope including a force sensing cantilever having a probe tip, said method comprising the steps of applying a magnetic driving force to said probe tip to cause an oscillatory motion of said probe tip, displacing said cantilever by applying a piezoelectric force to said cantilever, and reapplying said magnetic driving force to said probe tip to cause further oscillatory motion.

18. A method as claimed in claim 17 including the step of recording the movement of said probe tip as a function of time.

19. A method as claimed in claim 17 in which the steps of displacing said cantilever and then reapplying said magnetic driving force to said probe tip are repeated.

* * * * *